United States Patent
Diab

(10) Patent No.: US 8,453,012 B2
(45) Date of Patent: May 28, 2013

(54) SYSTEM AND METHOD FOR COMMUNICATING INFORMATION RELATING TO POWERED DEVICE POWER INTERRUPTION AND ASSOCIATED POWER SOURCING EQUIPMENT FALLBACK POWER

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 862 days.

(21) Appl. No.: 12/036,321

(22) Filed: Feb. 25, 2008

(65) Prior Publication Data

US 2009/0217062 A1    Aug. 27, 2009

(51) Int. Cl.
*G06F 11/00* (2006.01)

(52) U.S. Cl.
USPC .......................................................... 714/14

(58) Field of Classification Search
USPC .......................................................... 714/14
See application file for complete search history.

(56) References Cited

U.S. PATENT DOCUMENTS

| | | |
|---|---|---|
| 7,472,290 B2 | 12/2008 | Diab et al. |
| 7,478,251 B1 | 1/2009 | Diab et al. |
| 2006/0077888 A1 | 4/2006 | Karam et al. |
| 2006/0092826 A1* | 5/2006 | Karam et al. ................ 370/216 |
| 2006/0143583 A1* | 6/2006 | Diab et al. ........................ 716/4 |
| 2006/0179147 A1* | 8/2006 | Tran et al. ...................... 709/227 |
| 2007/0030613 A1* | 2/2007 | Sousa et al. ..................... 361/92 |
| 2007/0253382 A1* | 11/2007 | Ghassemzadeh et al. .... 370/338 |
| 2008/0052546 A1* | 2/2008 | Schindler et al. ............. 713/300 |

* cited by examiner

*Primary Examiner* — Scott Baderman
*Assistant Examiner* — Jigar Patel
(74) *Attorney, Agent, or Firm* — Duane S. Kobayashi

(57) ABSTRACT

A system and method for communicating information relating to powered device (PD) power interruption and associated power sourcing equipment (PSE) fallback power. A PD can be powered using a primary local power source and a secondary power over Ethernet (PoE) power source. The PD communication can provide information that relates to PSE power delivery to the PD that is contingent upon detection of a failure occurring at the powered device.

13 Claims, 4 Drawing Sheets

SYSTEM AND METHOD FOR COMMUNICATING INFORMATION RELATING TO POWERED DEVICE POWER INTERRUPTION AND ASSOCIATED POWER SOURCING EQUIPMENT FALLBACK POWER

BACKGROUND

1. Field of the Invention

The present invention relates generally to power over Ethernet (PoE) and, more particularly, to a system and method for communicating information relating to powered device (PD) power interruption and associated power sourcing equipment (PSE) fallback power.

2. Introduction

In a PoE application such as that described in the IEEE 802.3af and 802.3at specifications, a power sourcing equipment (PSE) can deliver power to a powered device (PD) over Ethernet cabling. Various types of PDs exist, including voice over IP (VOIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In one application, PoE can be used to provide power backup for a device. In other words, the device can be designed to receive power primarily from a local power source such as a power-supply brick plugged into a wall outlet or power strip. Only in the event of a failure in the local power source would the device need to be supplied with power from the backup PoE power source.

In this power backup application, it is important that the transition between the primary local power source and the backup PoE power source occurs seamlessly. As would be appreciated, a seamless transition between the primary local power source and the backup PoE power sources would ensure that the device operates predictably during the transition. What is needed therefore is a mechanism that enables configuration of a PSE as a backup power source.

SUMMARY

A system and/or method for communicating information relating to powered device (PD) power interruption and associated power sourcing equipment (PSE) fallback power, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
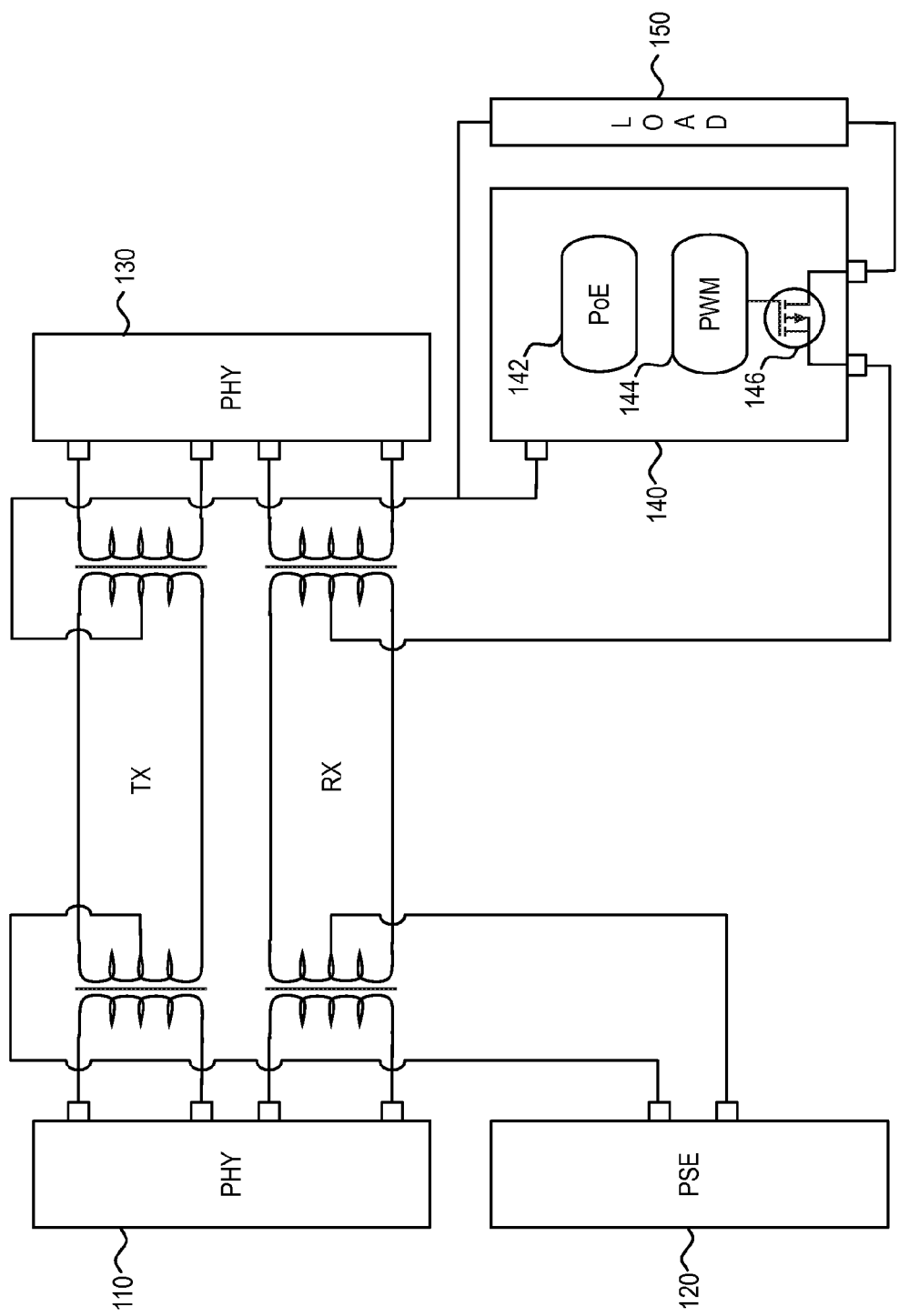
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology. Here, it should be noted that PoE does not require the presence of a PHY.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE may be able to deliver up to 30 W of power to a PD over two wire pairs. A PSE may also be configured to deliver power to a PD using four wire pairs. Other proprietary solutions can potentially deliver higher or different levels of power to a PD. In general, high power solutions are often limited by the limitations of the cabling.

Figure 2:
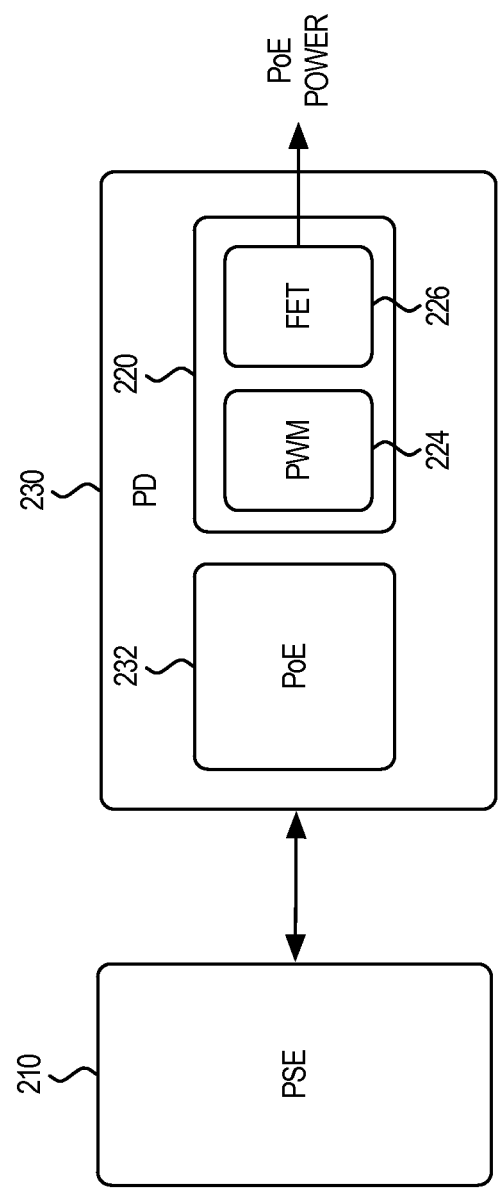
FIG. 2 illustrates a simplified view of a PoE system.

FIG. 2 illustrates a simplified view of a PoE system. In this illustration, PSE 210 is shown delivering power to PD 230. As further illustrated in FIG. 2, PD 230 includes PoE module 232. This module includes the electronics that would enable PD 230 to communicate with PSE 210 in accordance with a PoE specification such as IEEE 802.3af, 802.3at, etc. PD 230 also includes power module 220, which further includes a PWM controller 224 and power FET 226. As noted, power FET 226 is designed to produce output PoE power based on the power provided by PSE 210 over network cabling. In various embodiments, PWM controller 224 and power FET 226 can be incorporated in a single die, or can be on separate dies as part of a multi-chip module.

A conventional application of PoE is as a primary power source for a PD. In this application, the PSE would have the sole responsibility for providing power to one or more PDs. Any failure in the PoE system or oversubscription in the available PSE power would lead to a shut down or diminished operation of the PD. For this reason, much effort has been expended in identifying various mechanisms that would ensure that the PSE provides a consistent source of power to as many PDs as possible. In another application, PoE could be used either at a subset of its power delivery or even at full delivery but for a secondary function, such as powering additional functions and/or charging a battery, etc.

In yet another application, the PoE system can be designed to operate as a backup source of power instead of as a primary source of power. In this application, the PD would be powered primarily from a local power source, and not from the PSE. In one example, the PD could receive power from the PSE only upon some failure in the local power source. As would be appreciated, the PSE can be designed to operate as both a primary source of power and a backup source of power to selected PDs that are connected to the PSE.

One of the issues in using a PSE as a backup source of power is the management of the transition between power sources. As would be appreciated, a failure in the local source of power would often result in a serious disruption in the operation of the PD. This disruption in operation can lead to inconsistent and/or undefined PD behavior in the process of responding to the failure in the local power source. Here, the potential for the device shutting down, rebooting and/or misbehaving or operating unreliably makes any attempt to using PoE as a backup power source unrealistic.

In one solution, consistent behavior in the PD, upon a failure in the local power source, can be aided by the definition of one or more controlled fallback states for the PD. In one example, a fallback state would aid in the switching over from a primary source, wherein a shutdown of non-essential functions would happen so that the reaction time and total power draw of the essentials is within the requirement of the PoE power source. Controlled fallback state(s) can represent bounded power state(s) that would last for a certain amount of time (e.g., hundreds of milliseconds) until a secondary source of power can be activated or otherwise transitioned. For example, the controlled and bounded fallback state(s) can be used to ensure that the communication channels to the switch and basic diagnostic circuitry that is in the PD could be kept operational for a specific amount of time. Operation of the PD in the fallback state(s) during this time could then be used to configure the receipt of secondary power from the PSE. As this example illustrates, the definition of controlled fallback state(s) can ensure consistent behavior by the PD in responding to a failure of the local power source. In other words, during the transition to the PoE power source as the primary, the behavior is defined, bounded in both power/time, and predictable.

In various implementations, the operation of the device when using secondary power may be (1) the same as normal where the PoE and non-PoE power source are capable of delivering the same power, (2) a subset of the functionality if the PoE source can only provide a lower amount of power, or (3) a subset of the functionality during the hardware initiation state of the PoE (including hardware classification) that may transition into a different subset of functionality or full functionality when a further classification process (e.g., Layer 2 engine) of the PoE system completes.

Figure 3:
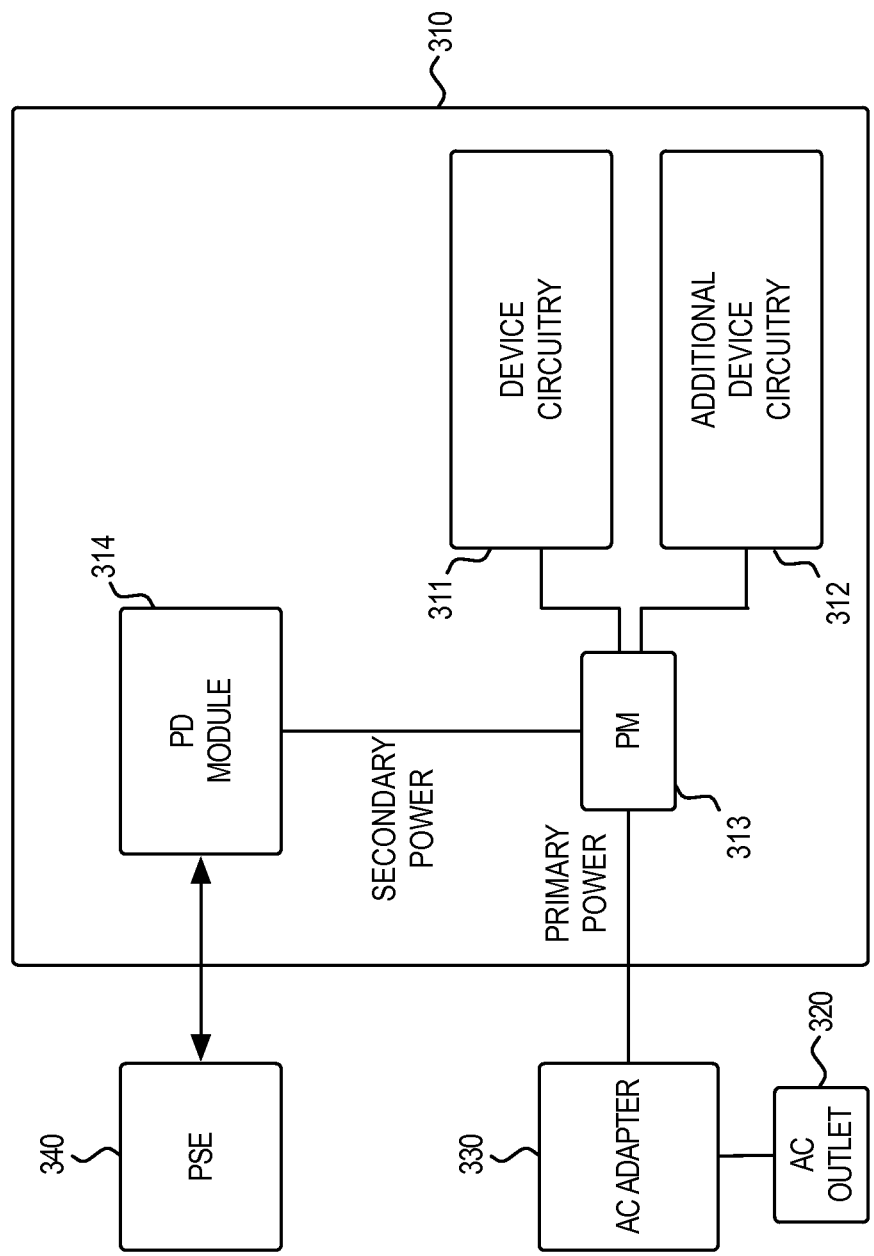
FIG. 3 illustrates an embodiment of a PoE system that is used for backup power.

FIG. 3 illustrates an example of a PoE system that is designed to utilize a secondary source of power. As illustrated, device 310 uses AC outlet 320 and AC adapter 330 as its primary source of power. The primary power received from this local power source is fed to power management (PM) 313, which feeds the needed power to device circuitry 311 and additional device circuitry 312. Here, device circuitry 311 represents those components that enable device 310 to perform its primary function (e.g., VOIP phone, wireless LAN access point, laptop, etc.), while additional device circuitry 312 represents those components that enable device 310 to perform secondary functions. The feeding by PM 313 of power from AC adapter 330 to device circuitry 311 and possibly secondary device circuitry 312 can represent the normal operating state of PD 310.

As illustrated, PM 313 is also designed to receive secondary power from PD module 314. It should be noted that PM 313 may be configured to operate as a switch if the PoE subsystem is operating as a backup power source. PM 313 may also be designed to manage a power pool that includes power from local and PoE power sources. Here, if one of the power sources falters, then the remaining power source can become the primary or even sole power supply.

In one embodiment, PD module 314 would include the electronics that would enable PoE communication with PSE 340 as well as a power module for generating secondary power. During the normal operating state of device 310 where PoE is used as a backup power source, PD module 314 can be maintained in any one of a variety of operating states. For example, PD module 314 can be designed to be maintained in any one of a pre-detection state, post-detection state, pre-classification state, post-classification state, or other pre-power application state. This can be the case because PD module 314 may not be used to actively power device 310 while power device 310 is in its normal operating state, but may be maintained in a state that can ultimately lead to a transition to a state of power application. As would be appreciated, the state in which PD module 314 is maintained would be implementation dependent. Here, the choice of state would be influenced by such factors as the source (e.g., remote PSE or local) and amount of power needed to maintain such state, the power request/priority or reservation protocol implemented by the PSE and PD module, the time to transition to the active use of secondary power from the PSE, etc.

It should be noted that PD module 314 can also be maintained in a powering state if it is part of the power pool that is managed by PM 313. In this scenario, the primary and secondary sources of power can be used to selectively power multiple pieces of functionality that exist in the device. In one example, this allocation can be based on the relative priority of the functionality. When either of the power sources falters in some way, a fallback state can be entered where certain functions are dropped or otherwise limited to thereby enable the resulting functionality to fit within the remaining power budget (or budget-ready sources).

Regardless of the state in which PD module 314 is maintained, it is critical that a failure in the local power source will produce consistent results by PD module 314 in activating or otherwise transitioning the secondary power. These consistent results can be produced through the definition of controlled fallback state(s) in device 310. Here, a controlled fallback state represents a state in which at least the components in device 310 that are needed to activate or otherwise transition the secondary power are maintained in an active state for a limited duration of time. During this limited duration of time, all or part of the circuitry in device 310 would be disabled due to the loss of the primary power source.

In one example, the components in device 310 that are needed to activate or otherwise transition the secondary power would include PD module 314. This is the case since PD module 314 would be involved in coordinating the provision of power by PSE 340 to device 310. In one scenario, the coordination of the provision of power can be done without regard to the needs of circuitry in device 310. This can be the case, for example, where the needs of circuitry in device 310 are relatively static, or only an initial predefined power level is requested. In another scenario, the coordination of the provision of power can be done in consideration of the needs of circuitry in device 310. This can be the case, for example, where recent or anticipated power levels are considered. In one embodiment, the controlled fallback state can also maintain those components that would enable device 310 to save certain information (e.g., current power level, future power levels, failure logs, state information, etc.) to memory upon failure of the primary power source. This saved information can then be accessed by PD module 314 and communicated to the switch during the controlled fallback state. Where the information is power related, it can be used in the request/reservation protocol between PSE 340 and PD module 314.

As has been described, the controlled fallback state(s) can represent a state of reduced functionality for device 310. In many instances, the reduced functionality would represent a state where some circuitry in device 310 is inactive due to the loss of the primary power source. In a typical scenario, the controlled fallback state(s) also have limited durations that are relatively short. For example, the controlled fallback state(s) can have a duration that is long enough simply to transition device 310 into a state where PSE power has been turned on. In one scenario, this duration can last for less than one second, depending upon the implementation.

To support controlled fallback state(s) that have reduced device functionality and limited duration, a source of power is needed to maintain the reduced device functionality. In one embodiment, an amount of power can be provided by PoE at a level that would be sufficient to power the controlled fallback state(s). In another embodiment, the fallback state(s) power can represent any power source (e.g., capacitance, battery, etc.) within device 310 that can support the limited duration of reduced functionality.

In an environment where a PD can leverage a secondary source of PoE power, it is important that a mechanism exists that enables configuration of a PSE as the secondary source of power. In conventional systems, a PD and PSE are designed to communicate regarding a current power level that a PD needs. This communication can include a negotiation of a power budget that is to be assigned to the PD's current need. The negotiated power budget is then used by the PSE in operating as a primary source of power to the PD. Typically, the PSE in this context is the sole source of power to the PD.

Where the PSE functions in a role as a secondary power source, conventional PD-PSE communications do not suffice. This is due to the fact that the PSE's function in a secondary role may not include an actual delivery of power to the PD. The PSE in this case may simply function in a standby mode. Conventional PD-PSE negotiations would therefore be inapplicable since the PD's need of power from a secondary power source does not yet exist.

In facilitating a smooth transition in the use of a PSE as a secondary source of power, it is recognized that current PD-PSE communication mechanisms are inadequate. The principles of the present invention therefore provide a mechanism for enhanced communication between a PD and PSE that can accommodate future activation or other transition of a PSE in providing a secondary source of power. Here, the PD can be designed to communicate information to the PSE that can be used in a secondary source powering scenario that is contingent on the future occurrence of an event (e.g., power source disruption) at the PD.

In one embodiment, the communication is facilitated by an enhancement to existing Layer 2 protocols that implement PD power classification. As would be appreciated, existing Layer 2 protocols can enable dynamic power negotiation after an initial power classification performed using Layer 1. This dynamic power negotiation remains focused, however, on the current power needs of the PD.

In the present invention, an enhancement to existing protocols would enable the PD to communicate to the PSE additional parameters related to sudden power failure at the PD and associated power fallback requirements. These parameters would be used, for example, when the PD experiences a disruption in powering from a non-PoE source.

In one scenario, the enhanced protocol can be used to signal to the PSE the type of role in which the PSE would operate. In conventional systems, the PSE operates solely in a role as a primary power source. Communications between the PD and PSE would therefore focus on an existing power need. In accordance with the present invention, the PSE can also operate in a role as a secondary power source. Here, the PSE can provide no power or provide only a subset of its available power. In this context, the PD can provide the PSE with valuable information regarding its role and the related power demands.

In one example, the PD can inform the PSE using the enhanced protocol that the PSE is operating as a backup power source where no power is needed for current needs, and that a certain power level is needed upon a failure of the primary power source. In another example, the PD can inform the PSE using the enhanced protocol that the PSE is operating as a secondary power source in a power pool where a first power level is needed for current needs, and that a second power level is needed upon a failure of the primary power source. In these and other examples, the identification of a role (e.g., primary, secondary, etc.) and current and future contingent power needs of the PD would enable the PSE to better budget the total power for which it is responsible.

In another scenario, the enhanced protocol can be used to signal to the PSE parameters that would enable the PSE to detect a failure in the PD. For example, the PD can report the maximum dV/dt, dI/dt and other reaction parameters that would be applicable to the normal operation of the PD. In a conventional system, swings in di/dt or dv/dt would cause the PSE to put the PD in a violated state or a shutdown state. With the present invention, the reported parameters can assist the PSE in activating the PSE as a secondary power source, rather than simply labeling an error or shutdown condition.

In yet another scenario, the enhanced protocol can be used to provide additional information that can be used by the PSE in operating in a role as a secondary power source. For example, the PD can report an amount of time that the PSE has to meet a power demand upon occurrence of an event at the PD. As would be appreciated, this reaction time (or rampup time) can vary based on the design of the PD. If the PD is designed with an extended fallback state that can facilitate a transition from a primary to a secondary power source, then the time to react or meet the demand of the PD would be greater. On the other hand, if the PD is designed with a shorter fallback state, then the time to react or meet the demand of the PD would be greater. As would be appreciated, this information would enable the PSE to coordinate a response to an event at the PD.

In another example, the PD can report fallback power state information or parameters to the PSE. As noted, fallback states can be defined to aid a smooth transition from a primary to a secondary power source. One or more fallback states can be defined. In one example, the PD can provide the PSE with information regarding power levels needed for one or more fallback states. In this context, the power level information can be provided for the transition period where the secondary power source is being ramped up, as well as the steady-state period where the secondary power source is fully functional. As noted above, various fallback states can define different levels of active and inactive functionality for components within the PD. With information regarding the various fallback states power levels, timing, etc., the PSE can more effectively budget its available power in the various stages of operation as a secondary power source for the PD.

In many of the examples above, the PD communicates information to the PSE prior to the occurrence of an event (e.g., power disruption) at the PD. This information would therefore be useful on a contingency basis in the future as compared to a current power need. In one example, communication from the PD to the PSE regarding the PSE's operation as a secondary power source can also occur in response to an event at the PD.

In one example, the PD can have a fallback state that supports the transmission of a "dying gasp" message. In a scenario where the PSE operates as a power backup, a failure in the primary power source can cause the PD to enter a fallback state. This fallback state can be defined for a short amount of time where the PD can send a message to the PSE indicating that the PD needs power now, that it needs power in X ms, etc. The "dying gasp" message can also include a download of critical parameters (e.g., diagnostic information) that are relevant to the failure condition and/or its recovery.

Figure 4:
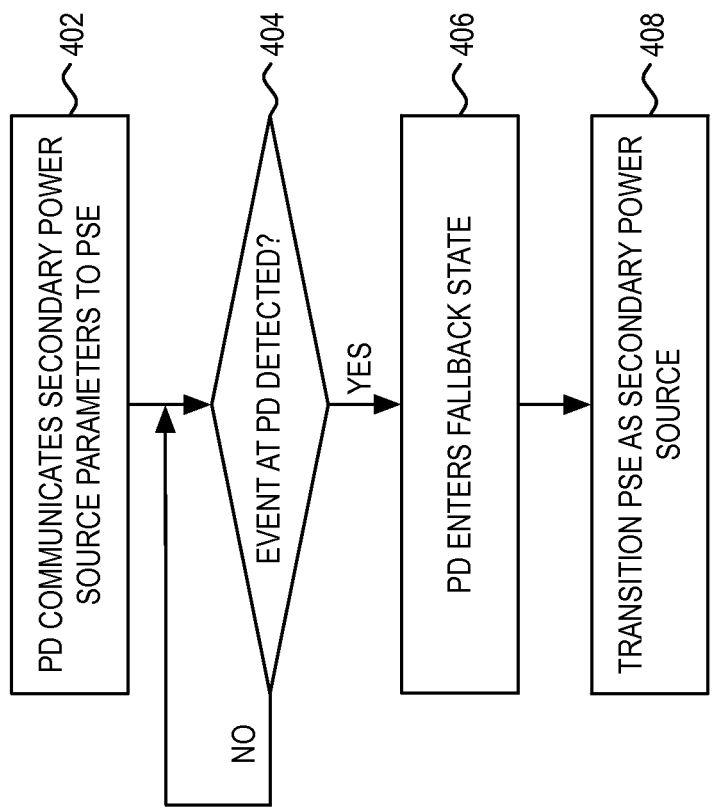
FIG. 4 illustrates a flowchart of a process of the present invention.

To further illustrate the principles of the present invention, reference is now made to the flowchart of FIG. 4. As illustrated, the process begins at step 402, where a PD communicates secondary power source parameters to a PSE. As noted above, the particular type of secondary power source parameters that are sent by the PD to the PSE would be implementation dependent. In one example, the transmitted parameter could simply indicate that the PSE is to operate as a secondary and not a primary power source for the PSE. Significantly, this communication is designed to accommodate a future activation or other transition of a PSE in operating as a secondary power source. This future activation can be contingent on the occurrence of an event at the PD, rather than a need to be fulfilled in the present.

After the communication occurs at step 402, the process continues to step 404 where a determination is made as to whether an event at the PD is detected. In one example, this detection can occur at the PSE, and can be based on detection parameters (e.g., maximum dV/dt, dI/dt, etc.) that are reported to the PSE by the PD. In another example, the event can be detected by the PD. Here, detection can be facilitated through a power good signal that is reflective of the active powering by the local power source such as an AC adapter. In one embodiment, the power good signal can be received by a controller module (e.g., PoE module) in the device that will remain active upon the failure in the local power source. A change in the status of the received power good signal would then serve to initiate a response to the failure in the local power source.

Upon a detection of an event at step 404, the process would then continue to step 406 where the PD would enter into a fallback state. As part of entering into the fallback state, the PD can enter into a state of reduced functionality, wherein at least those components in the device that are needed for post-event processing are maintained in an active state. Unneeded components can be shut down due to the loss of power. In one example, the PD can also send a "dying gasp" message to the PSE while in the fallback state.

Next, at step 408, a transition in secondary power would occur. In one embodiment, this step would include a PD module activating the backup PoE power. In another embodiment, this step would include PD module increasing the amount of power that is provided by the PSE. Regardless of the type of transition needed at step 408, the process can be enabled using information that was previously communicated to the PSE at step 402. For example, the previous communication could include parameters regarding a rampup time or power level needed.

As would be appreciated, these communications can be performed using packets (e.g., LLDP, LLDP-MED, OAM or any other Layer 2 protocol), or other physical signaling technique.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A powered device, comprising:
a first port that is configured to receive a network cable that is coupled to a power sourcing equipment;
a second port that is configured to receive a power cable that delivers power to the powered device from an AC adapter coupled to an AC outlet;
a temporary internal power source, said temporary internal power source enabling the powered device to operate in a fallback state having less functionality than an active state after the powered device fails to receive power via said second port and prior to receiving power via said first port; and
a controller, said controller being configured to initiate a communication to said power sourcing equipment via said network cable, said communication being initiated while the powered device receives power via said second port for operation in an active state and prior to an initiation of a delivery of power via said first port, said communication including a power recovery time parameter that indicates to said power sourcing equipment an amount of time that said power sourcing equipment has to activate a delivery of power to the powered device, said temporary internal power source also enabling said controller to initiate a transmission of diagnostic information to said power sourcing equipment during said fallback state.

2. The powered device of claim 1, wherein said communication further includes an indication of a power level that is supplied by said power sourcing equipment to the powered device after it is determined that the powered device fails to receive power via said second port.

3. The powered device of claim 1, wherein said communication further includes detection information that enables said power sourcing equipment to determine when the powered device fails to receive power via said second port.

4. The powered device of claim 3, wherein said detection information includes dV/dt, dI/dt and/or other reaction parameters that can be used by said power sourcing equipment to monitor an interface that is coupled to said network cable.

5. The powered device of claim 1, wherein said communication further includes an indication that said power sourcing equipment is to operate in a standby mode while the powered device receives power via said second port.

6. A powered device, comprising:
a first port that is configured to receive a network cable that is coupled to a power sourcing equipment;
a second port that is configured to receive a power cable that delivers power to the powered device from an AC adapter coupled to an AC outlet;
a temporary internal power source, said temporary internal power source enabling the powered device to operate in a fallback state having less functionality than an active state after the powered device fails to receive power via said second port and prior to receiving power via said first port; and
a controller, said controller being configured to initiate a communication to said power sourcing equipment via said network cable, said communication being initiated while the powered device receives power via said second port for operation in an active state and prior to an initiation of a delivery of power via said first port, said communication including a backup power level indicator, said backup power level indicator being used by said power sourcing equipment in activating a delivery of power to the powered device via said first port, said temporary internal power source also enabling said controller to initiate a transmission of diagnostic information to said power sourcing equipment during said fallback state.

7. The powered device of claim 6, wherein said communication further includes information that enables said power sourcing equipment to determine when the powered device fails to receive power via said second port.

8. The powered device of claim 7, wherein said detection information includes dV/dt, dI/dt and/or other reaction parameters that can be used by said power sourcing equipment to monitor an interface that is coupled to said network cable.

9. The powered device of claim 6, wherein said communication further includes an indication that said power sourcing equipment is to operate in a standby mode while the powered device receives power via said second port.

10. A method, comprising:
receiving, by a powered device, power via a first port, said first port being coupled to a power cable that receives power from an AC adapter coupled to an AC outlet, said power via said first port enabling said powered device to operate in an active state; and
while said powered device receives power via said first port that enables operation of said powered device in an active state and prior to an initiation of a delivery of power by a power sourcing equipment to said powered device via a second port in said powered device that is coupled to said power sourcing equipment via a network cable, transmitting a message to said power sourcing equipment via said network cable, said message including a backup power level indicator, said backup power level indicator being used by said power sourcing equipment in activating a delivery of power to said powered device via said second port; and
operating said powered device in a fallback state that is powered via a temporary internal power source in said powered device, said fallback state having less functionality than said active state after said powered device fails to receive power via said first port and prior to receiving power via said second port, wherein said temporary internal power source enables said powered device to send diagnostic information to said power sourcing equipment during said fallback state.

11. The method of claim 10, wherein said message further includes information that enables said power sourcing equipment to determine when said powered device fails to receive power via said second port.

12. The method of claim 11, wherein said detection information includes dV/dt, dI/dt and/or other reaction parameters that can be used by said power sourcing equipment to monitor an interface that is coupled to said network cable.

13. The method of claim 10, wherein said message further includes an indication that said power sourcing equipment is to operate in a standby mode while said powered device receives power via said first port.

* * * * *